(12) United States Patent
Szarvasy et al.

(10) Patent No.: US 11,578,837 B2
(45) Date of Patent: Feb. 14, 2023

(54) SENSOR DEVICE AND SENSING METHOD

(71) Applicant: Rolls-Royce Deutschland Ltd & Co KG, Blankenfelde-Mahlow (DE)

(72) Inventors: Ivo Szarvasy, Stahnsdorf (DE); Tobias Leymann, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/156,216

(22) Filed: Jan. 22, 2021

(65) Prior Publication Data

US 2021/0239277 A1 Aug. 5, 2021

(30) Foreign Application Priority Data

Jan. 30, 2020 (DE) .................. 10 2020 102 332.4

(51) Int. Cl.
*F17D 3/18* (2006.01)
*F01D 17/08* (2006.01)
(Continued)

(52) U.S. Cl.
CPC ............ *F17D 3/18* (2013.01); *F01D 17/085* (2013.01); *F17D 3/01* (2013.01); *G01L 19/12* (2013.01);
(Continued)

(58) Field of Classification Search
CPC . F17D 3/18; F17D 3/01; F01D 17/085; G01L 19/12; G01M 3/002; F17C 2250/043; F17C 2250/0439; F17C 2250/0443
(Continued)

(56) References Cited

U.S. PATENT DOCUMENTS 3,245,219 A * 4/1966 Sieck .................. F04D 27/0261
415/10
5,051,918 A * 9/1991 Parsons ................ F04D 27/001
415/17
(Continued)

FOREIGN PATENT DOCUMENTS

DE 69601531 T2 9/1999
WO WO-2011133293 A1 * 10/2011 ........... F04D 27/001

OTHER PUBLICATIONS

"GT2006-90324" Development and Demonstration of a Stability Management System for Gas Turbine Engines', Proceedings of GT2006 ASME Turbo Expo 2006, GT2006-90324 (Year: 2008).*
(Continued)

*Primary Examiner* — Timothy P. Kelly
*Assistant Examiner* — Christopher M Afful
(74) *Attorney, Agent, or Firm* — Shuttleworth & Ingersoll, PLC; Timothy J. Klima (57) ABSTRACT

A sensor device determines measured values of a property of a fluid, in particular of a gas, in a cavity of a gas turbine engine having a duct for carrying the fluid from the cavity to a sensor element. A data processing device is coupled to the sensor element and processes the measured values. The data processing device has a device for detecting changes in the measured values with respect to time, and an evaluation device, by which the changes in the measured values with respect to time can be detected. If there is a deviation in the changes in the measured values with respect to time from a predefined criterion, a signal relating to an at least partial blockage of the at least one inlet duct can be output. A measurement method is also disclosed.

20 Claims, 6 Drawing Sheets

(51) Int. Cl.
    *G01M 3/00* (2006.01)
    *F17D 3/01* (2006.01)
    *G01L 19/12* (2006.01)

(52) U.S. Cl.
    CPC ....... *G01M 3/002* (2013.01); *F17C 2250/043* (2013.01); *F17C 2250/0439* (2013.01); *F17C 2250/0443* (2013.01)

(58) Field of Classification Search
    USPC ..................................................... 60/39.091
    See application file for complete search history.

(56) References Cited

U.S. PATENT DOCUMENTS

| | | | |
|---|---|---|---|
| 8,661,832 B2* | 3/2014 | Griffin | F04D 27/0223 137/15.2 |
| 2015/0219516 A1 | 8/2015 | Grice | |
| 2015/0337679 A1 | 11/2015 | Everwyn et al. | |

OTHER PUBLICATIONS

German Search Report dated Jul. 29, 2020 from counterpart German Patent Application No. 10 2020 102 332.4.

* cited by examiner

SENSOR DEVICE AND SENSING METHOD

This application claims priority to German Patent Application DE102020102332.4 filed Jan. 30, 2020, the entirety of which is incorporated by reference herein.

The invention relates to a sensor device having the features of claim 1 and to a method having the features of claim 12.

In gas turbine engines in airplanes, sensor devices are used to detect different properties of fluids, especially gases, e.g. temperatures or pressures, in order to detect deviations from the nominal operating behavior, for example. This detection can only take place reliably if the operating ability of the sensor devices themselves is ensured. In particular, it is necessary to ensure that the gas to be measured can flow in an appropriate manner to a sensor element of the sensor device, i.e. the sensor device should be able to detect a blockage in the gas flow.

The object is achieved by the subject matter of claim 1.

Here, the sensor device is used to determine measured values of a property of a fluid, in particular of a gas, in a cavity of a gas turbine engine having at least one inlet duct for carrying the fluid, in particular the gas, from the cavity to a sensor element.

This sensor device has means by which a blockage in the inlet duct can be detected.

For this purpose, a data processing device is coupled to the sensor element, wherein the data processing device processes the measured values.

The data processing device has a means for detecting a change in the measured values with respect to time. It is thus not only a matter of detecting the measured values themselves but of the change in said values with respect to time. More particularly, mathematically speaking, a first derivative is determined numerically.

Furthermore, the data processing device has an evaluation means, by means of which the changes in the measured values with respect to time can be detected. If a deviation in the changes in the measured values with respect to time from a predefined criterion is detected, a signal relating to an at least partial blockage of the at least one inlet duct can be output.

Here, therefore, a blockage is inferred on the basis of the changes in the behavior of the measured values with respect to time.

In one embodiment, the evaluation means is designed to compare changes in the measured values with respect to time to prestored basic data on changes in measured values with respect to time for the same and/or a different property of the fluid, in particular of the gas.

In principle, it is also possible, for example, to compare the measured temperature data to prestored basic data of a different physical variable or several physical variables that allow inferences about the temperature characteristic. In this case, it is possible, for example, for several physical variables, e.g. including the rotational speed, to be functionally interlinkable by means of a model, thus enabling properties of the fluid, in particular of the gas, or other properties of the fluid, in particular of the gas, to be calculated.

In this case, the properties of the fluid, in particular of the gas, can be a temperature, a pressure or a composition. Detection of these properties allows inferences about deviations from the nominal behavior. In this case, it is possible, for example, for a state variable of the gas turbine engine to be determined, which in turn allows inferences about the fluid properties.

In this case, it is possible, in particular, for the cavity in the gas turbine engine to comprise a space between rotor disks of a compressor or of a turbine. In this region, the ingress of hot gases is regularly monitored by heat sensor devices, for example.

In one embodiment, a first derivative of the detected measured values can be determined numerically using the means for detecting a change in the measured values with respect to time.

In another embodiment, the prestored basic data in the data processing device comprise the time characteristic and/or a first derivative of the time characteristic of measured values during nominal operation without a blockage. These data can then form the starting point for the determination of a deviation from the nominal behavior.

It is also possible for the predefined criterion to comprise a temperature and/or a time interval, wherein these are stored, in particular, in the basic data as a table, a characteristic map and/or a functional relationship.

Furthermore, the prestored basic data in the data processing device may comprise the time characteristic and/or a first derivative of the time characteristic of measured values during nominal operation without a blockage. In this case, the basic data can include tables, characteristic maps and/or even functional descriptions of the properties, for example. The predefined deviation between changes in the measured values with respect to time and the prestored basic data also comprises, for example, a threshold value for the first derivative of the measured values or a change in the measured property of the fluid, in particular of the gas, with respect to time. If the numerical derivation of measured temperature data is slower than corresponds to the stored basic data, for example, this is evaluated as an indication of a blockage.

In this case, the measured values and/or changes in the measured values with respect to time, in particular the derivatives, may be determinable as a function of a thrust command of the gas turbine engine. A thrust command leads to a change in states in the gas turbine engine in a defined manner, in particular as a step response. It is thereby possible to determine precisely deviations from the nominal behavior in an effective way.

In another embodiment, the sensor element is arranged in a measurement zone into which the fluid, in particular the gas, flows under nominal operating conditions and out of which it flows at least partially via an outflow duct. In this case it is possible, in particular, for the sensor element to be situated outside a flow path that leads from the outflow duct to leaks, in particular the sensor element may be offset from an inlet of the outflow duct by a clearance. This prevents the sensor element from being in the leakage flow if there is backflow in the case of a blockage.

If the sensor device detects a blockage, it is possible in one embodiment for the signal to be used to switch off or change an operating state of the gas turbine device.

The object is also achieved by a measurement method having the features of claim 12.

As noted elsewhere herein, the present disclosure may relate to a gas turbine engine, for example an aircraft engine. Such a gas turbine engine may comprise a core engine comprising a turbine, a combustor, a compressor, and a core shaft connecting the turbine to the compressor. Such a gas turbine engine may comprise a fan (with fan blades) which is positioned upstream of the core engine.

Arrangements of the present disclosure may be advantageous in particular, but not exclusively, for geared fans, which are driven via a gear mechanism. Accordingly, the gas turbine engine may comprise a gear mechanism which is driven via the core shaft and the output of which drives the fan in such a way that it has a lower rotational speed than the core shaft. The input to the gear mechanism may be provided directly from the core shaft, or indirectly via the core shaft, for example via a spur shaft and/or spur gear. The core shaft may be rigidly connected to the turbine and the compressor, such that the turbine and compressor rotate at the same rotational speed (with the fan rotating at a lower rotational speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may furthermore comprise a second turbine, a second compressor, and a second core shaft connecting the second turbine to the second compressor. The second turbine, second compressor and second core shaft may be arranged so as to rotate at a higher rotational speed than the first core shaft.

In such an arrangement, the second compressor may be positioned axially downstream of the first compressor. The second compressor may be arranged to receive (for example directly receive, for example via a generally annular duct) a flow from the first compressor.

The gear mechanism may be designed to be driven by the core shaft that is configured to rotate (for example during use) at the lowest rotational speed (for example the first core shaft in the example above). For example, the gear mechanism may be designed to be driven only by the core shaft that is configured to rotate (for example during use) at the lowest rotational speed (for example only by the first core shaft and not the second core shaft, in the example above). Alternatively, the gear mechanism may be designed to be driven by one or more shafts, for example the first and/or second shaft in the example above.

In a gas turbine engine as described and/or claimed herein, a combustor may be provided axially downstream of the fan and compressor (or compressors). For example, the combustor may be directly downstream of (for example at the exit of) the second compressor, when a second compressor is provided. By way of further example, the flow at the exit of the compressor may be supplied to the inlet of the second turbine, if a second turbine is provided. The combustor may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (i.e. the angle of attack may be variable). The row of rotor blades and the row of stator blades may be axially offset with respect to one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset with respect to one another.

Each fan blade may have a radial span extending from a root (or a hub) at a radially inner location over which gas flows, or from a position of 0% span, to a tip with a 100% span. The ratio of the radius of the fan blade at the hub to the radius of the fan blade at the tip may be less than (or of the order of) any of the following: 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range bounded by two values in the previous sentence (i.e. the values may form upper or lower bounds). These ratios may be referred to in general as the hub-to-tip ratio. The radius at the hub and the radius at the tip may both be measured at the leading edge (or the axially forwardmost edge) of the blade. The hub-to-tip ratio refers, of course, to that portion of the fan blade over which gas flows, i.e. the portion radially outside any platform.

The radius of the fan may be measured between the engine centerline and the tip of the fan blade at its leading edge. The diameter of the fan (which can generally be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range bounded by any two of the values in the previous sentence (i.e. the values may form upper or lower bounds).

The speed of the fan may vary in operation. Generally, the speed is lower for fans with a larger diameter. Purely as a non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of a further non-limiting example, the rotational speed of the fan under cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

During the use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH of the flow. A fan tip loading may be defined as $dH/U_{tip}^2$, where dH is the enthalpy rise (for example the average 1-D enthalpy rise) across the fan and $U_{tip}$ is the (translational) speed of the fan tip, for example at the leading edge of the tip (which may be defined as fan tip radius at the leading edge multiplied by angular speed). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}\,K^{-1}/(ms^{-1})^2$). The fan tip loading may be in an inclusive range bounded by any two of the values in the previous sentence (i.e. the values may form upper or lower bounds).

Gas turbine engines in accordance with the present disclosure can have any desired bypass ratio, wherein the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by an engine nacelle and/or a fan casing.

The overall pressure ratio of a gas turbine engine as described and/or claimed herein may be defined as the ratio of the ram pressure upstream of the fan to the ram pressure at the exit of the highest pressure compressor (before entry into the combustor). By way of a non-limiting example, the overall pressure ratio of a gas turbine engine as described and/or claimed herein at constant speed can be greater than (or of the order of): 35, 40, 45, 50, 55, 60, 65, 70, 75. The overall pressure ratio may be in an inclusive range bounded by any two of the values in the previous sentence (i.e. the values may form upper or lower bounds).

The specific thrust of an engine can be defined as the net thrust of the engine divided by the total mass flow through the engine. The specific thrust of an engine as described and/or claimed herein at cruise conditions may be less than (or of the order of): 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN or 550 kN. The maximum thrust may be in an inclusive range bounded by any two of the values in the previous sentence (i.e. the values may form upper or lower bounds). The thrust referred to above may be the maximum net thrust under standard atmospheric conditions at sea level plus 15° C. (ambient pressure 101.3 kPa, temperature 30° C.), with the engine static.

During use, the temperature of the flow at the entry to the high-pressure turbine can be particularly high. This temperature, which may be referred to as TET, may be measured at the exit to the combustor, for example immediately upstream of the first turbine blade, which itself may be referred to as a nozzle guide blade. At cruising speed, the TET may be at least (or of the order of): 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in the use of the engine may be at least (or of the order of), for example: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, under a high thrust condition, for example under a maximum take-off thrust (MTO) condition.

A fan blade and/or airfoil portion of a fan blade described and/or claimed herein may be produced from any suitable material or combination of materials. For example at least a part of the fan blade and/or airfoil may be produced at least in part from a composite, for example a metal matrix composite and/or an organic matrix composite, such as carbon fiber. As a further example, at least a part of the fan blade and/or airfoil may be produced at least in part from a metal, such as a titanium-based metal or an aluminum-based material (such as an aluminum-lithium alloy) or a steel-based material. The fan blade may comprise at least two regions produced using different materials. For example, the fan blade may have a protective leading edge, which is produced using a material that is better able to resist impact (for example from birds, ice or other material) than the rest of the blade. Such a leading edge may, for example, be produced using titanium or a titanium-based alloy. Thus, purely by way of example, the fan blade may have a carbon-fiber or aluminium-based body (such as an aluminium-lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage with a corresponding slot in the hub (or disk). Purely as an example, such a fixture may be in the form of a dovetail that may slot into and/or be brought into engagement with a corresponding slot in the hub/disk in order to fix the fan blade to the hub/disk. As a further example, the fan blades may be formed integrally with a central portion. Such an arrangement may be referred to as a blisk or a bling. Any suitable method may be used to manufacture such a blisk or such a bling. For example, at least a part of the fan blades may be machined from a block and/or at least part of the fan blades may be attached to the hub/disk by welding, such as e.g. linear friction welding.

The gas turbine engines described and/or claimed herein may or may not be provided with a variable area nozzle (VAN). Such a variable area nozzle may allow the exit area of the bypass duct to be varied during operation. The general principles of the present disclosure can apply to engines with or without a VAN.

The fan of a gas turbine as described and/or claimed herein may have any desired number of fan blades, for example 16, 18, 20, or 22 fan blades.

As used herein, cruise conditions may mean the cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example of the order of 11000 m. The cruise conditions may correspond to standard atmospheric conditions at any given altitude in these ranges.

Purely as an example, the cruise conditions may correspond to the following: a forward Mach number of 0.8, a pressure of 23000 Pa and a temperature of −55° C.

As used anywhere herein, "cruising speed" or "cruise conditions" may mean the aerodynamic design point. Such an aerodynamic design point (or ADP) may correspond to the conditions (comprising, for example, the Mach number, environmental conditions and thrust demand) for which the fan is designed to operate. This may mean, for example, the conditions at which the fan (or gas turbine engine) is designed to have optimum efficiency.

During operation, a gas turbine engine described and/or claimed herein may be operated under the cruise conditions defined elsewhere herein. Such cruise conditions may be determined by the cruise conditions (for example the conditions during the middle part of the flight) of an aircraft on which at least one (for example two or four) gas turbine engine(s) may be mounted in order to provide propulsive thrust.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

Embodiments will now be described by way of example, with reference to the figures, in which.

Figure 1:
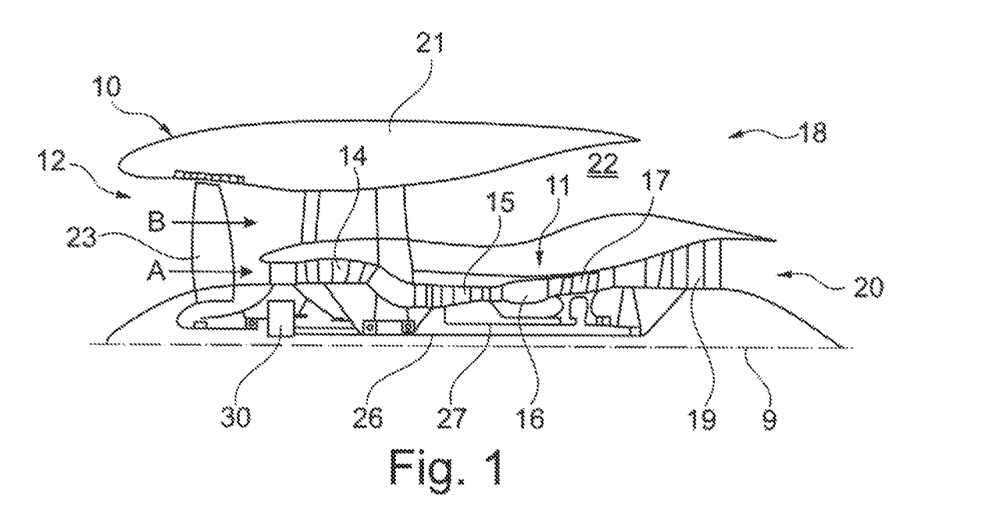
FIG. 1 shows a lateral sectional view of a gas turbine engine.

FIG. 1 illustrates a gas turbine engine 10 having a main axis of rotation 9. The engine 10 comprises an air intake 12 and a fan 23 that generates two air flows: a core air flow A and a bypass air flow B. The gas turbine engine 10 comprises a core 11 that receives the core air flow A. When viewed in the order corresponding to the axial direction of flow, the core engine 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 via a shaft 26 and an epicyclic planetary gear mechanism 30.

During operation, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by means of a suitable connecting shaft 27. The fan 23 generally provides the major part of the propulsive thrust. The epicyclic planetary gear mechanism 30 is a reduction gear mechanism.

Figure 2:
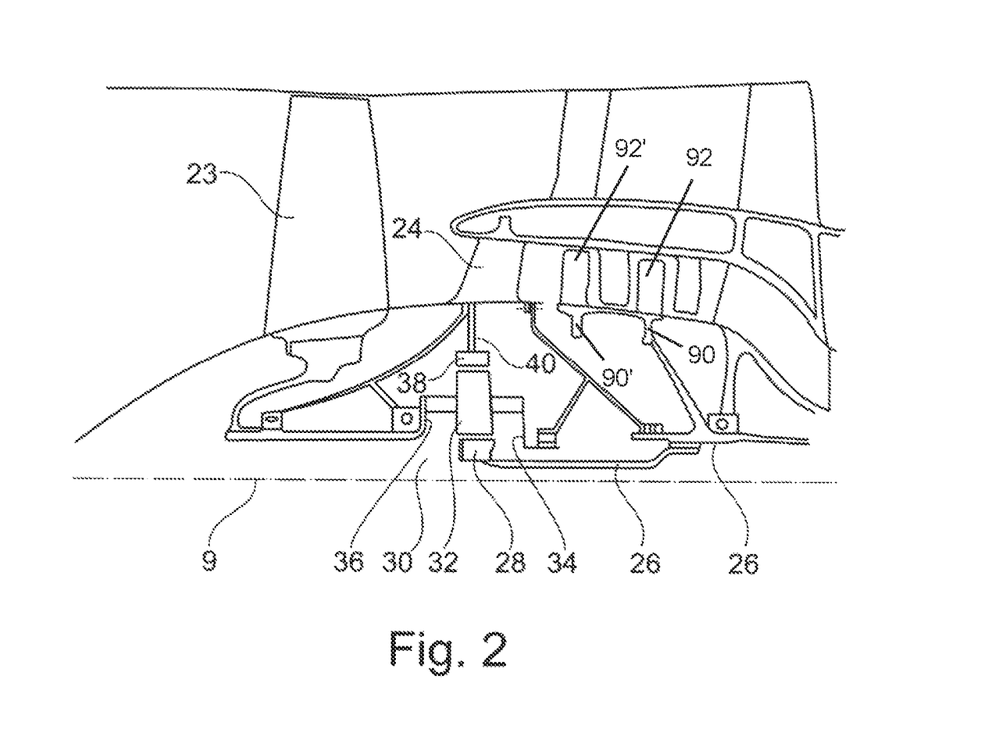
FIG. 2 shows a close-up lateral sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic planetary gear mechanism 30. Multiple planet gears 32, which are coupled to one another by a planet carrier 34, are situated radially to the outside of the sun gear 28 and mesh therewith. The planet carrier 34 guides the planet gears 32 in such a way that they circulate synchronously around the sun gear 28, whilst enabling each planet gear 32 to rotate about its own axis. The planet carrier 34 is coupled via linkages 36 to the fan 23 in order to drive its rotation about the engine axis 9. Radially to the outside of the planet gears 32 and meshing therewith is an external gear or ring gear 38 that is coupled, via linkages 40, to a stationary supporting structure 24.

It should be noted that the expressions "low-pressure turbine" and "low-pressure compressor", as used herein, can be taken to mean the lowest-pressure turbine stage and lowest-pressure compressor stage (i.e. not including the fan 23), respectively, and/or the turbine and compressor stages that are connected together by the connecting shaft 26 with the lowest rotational speed in the engine (i.e. not including the gearbox output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first, or lowest-pressure, compression stage.

Figure 3:
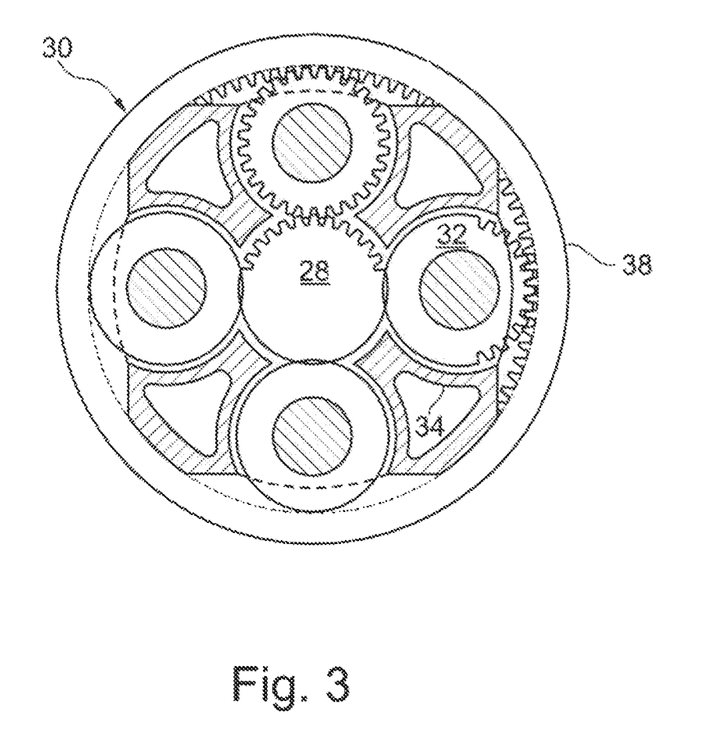
FIG. 3 shows a partially cut-away view of a gear mechanism for a gas turbine engine.

The epicyclic planetary gear mechanism 30 is shown by way of example in greater detail in FIG. 3. The sun gear 28, planet gears 32 and ring gear 38 in each case comprise teeth on their periphery to allow intermeshing with the other gearwheels. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic planetary gear mechanism 30 generally comprise at least three planet gears 32.

The epicyclic planetary gear mechanism 30 illustrated by way of example in FIGS. 2 and 3 is a planetary gear mechanism in which the planet carrier 34 is coupled to an output shaft via linkages 36, with the ring gear 38 being fixed. However, any other suitable type of planetary gear mechanism 30 may be used. As a further example, the planetary gear mechanism 30 may be a star arrangement, in which the planet carrier 34 is held fixed, with the ring gear (or external gear) 38 allowed to rotate. In such an arrangement, the fan 23 is driven by the ring gear 38. As a further alternative example, the gear mechanism 30 can be a differential gear mechanism in which both the ring gear 38 and the planet carrier 34 are allowed to rotate.

It will be appreciated that the arrangement shown in FIGS. 2 and 3 is by way of example only, and various alternatives are within the scope of protection of the present disclosure. Purely by way of example, any suitable arrangement can be used for positioning the gear mechanism 30 in the engine 10 and/or for connecting the gear mechanism 30 to the engine 10. By way of a further example, the connections (such as the linkages 36, 40 in the example of FIG. 2) between the gear mechanism 30 and other parts of the engine 10 (such as the input shaft 26, the output shaft and the fixed structure 24) may have a certain degree of stiffness or flexibility. As a further example, any suitable arrangement of the bearings between rotating and stationary parts of the engine 10 (for example between the input and output shafts of the gear mechanism and the fixed structures, such as the gear casing) may be used, and the disclosure is not limited to the exemplary arrangement of FIG. 2. For example, where the gear mechanism 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having any arrangement of gear mechanism types (for example star or epicyclic-planetary), supporting structures, input and output shaft arrangement, and bearing positions.

Optionally, the gear mechanism may drive additional and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. By way of a further example, the gas turbine engine shown in FIG. 1 has a split flow nozzle 20, 22, meaning that the flow through the bypass duct 22 has its own nozzle that is separate from and radially outside the core engine nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable area. Whilst the described example relates to a turbofan engine, the disclosure may be applied, for example, to any type of gas turbine engine, such as an open-rotor (in which the fan stage is not surrounded by a nacelle) or turboprop engine, for example. In some arrangements, the gas turbine engine 10 may not comprise a gear mechanism 30.

The geometry of the gas turbine engine 10, and components thereof, is/are defined by a conventional axis system, comprising an axial direction (which is aligned with the axis of rotation 9), a radial direction (in the bottom-to-top direction in FIG. 1), and a circumferential direction (perpendicular to the view in FIG. 1). The axial, radial and circumferential directions run so as to be mutually perpendicular.

At different points in the gas turbine engine 10 there are cavities 70, in which gases G, in particular air, collect or through which gases G, in particular air, flow. Thus, air is taken from a compressor stage and used for cooling purposes, for example.

It is important here, inter alia, to reliably determine properties of the gas G during the operation of the gas turbine engine 10, since an excessively high gas temperature, for example, indicates the failure of the gas turbine engine 10 or of part of said engine.

The case of gas temperature measurement in a cavity between rotor disks 90 in the region of the compressors 14, 15 is described below. In this case, the description is given, with reference to the schematic illustration in FIGS. 4A, 4B, 5 and 6, of an embodiment of a sensor device 50 in which, in particular, a blockage H of an air-carrying inlet duct 52 positioned in one of the rotor disks 90 can be determined by means of a sensor element 51 (e.g. a bimetallic thermocouple).

Figure 4A:
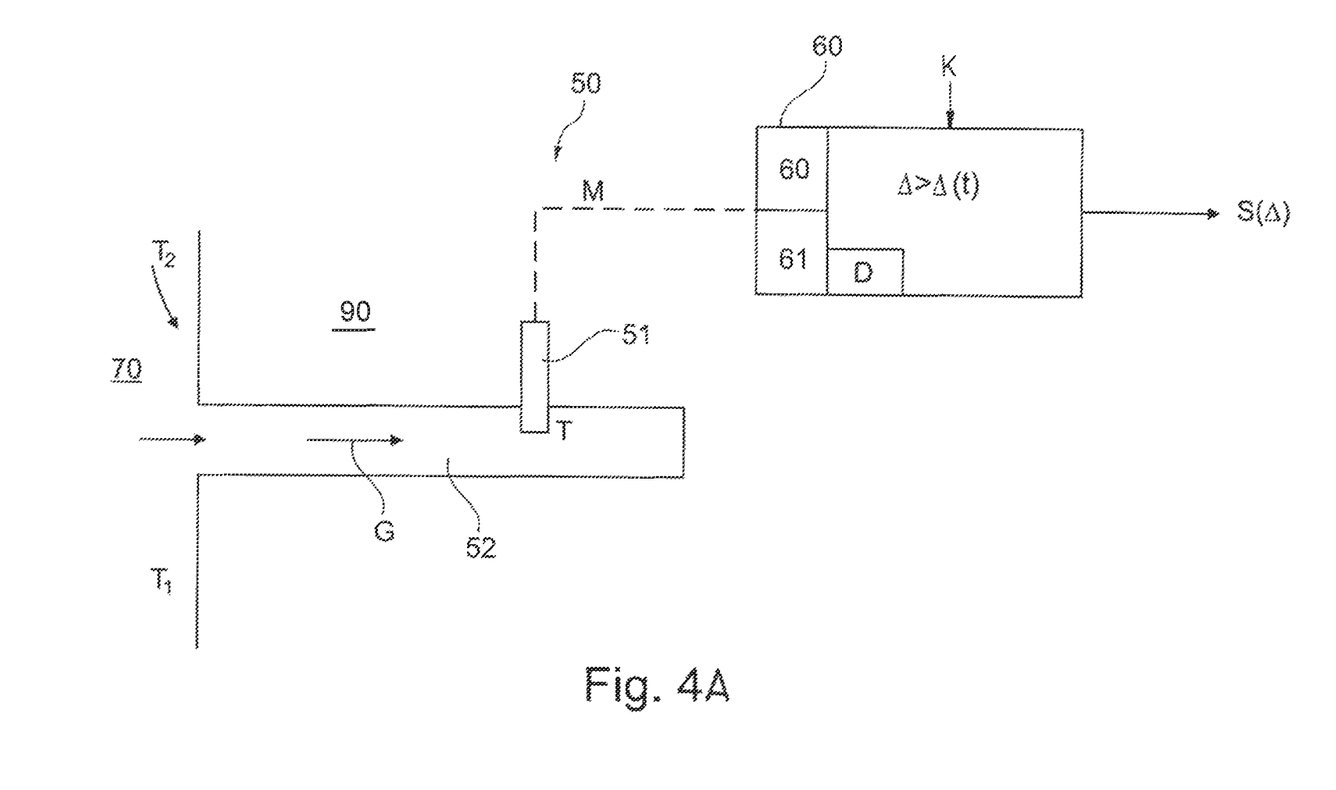
FIG. 4A shows a schematic illustration of one embodiment of a sensor device for temperature measurement.
Figure 4B:
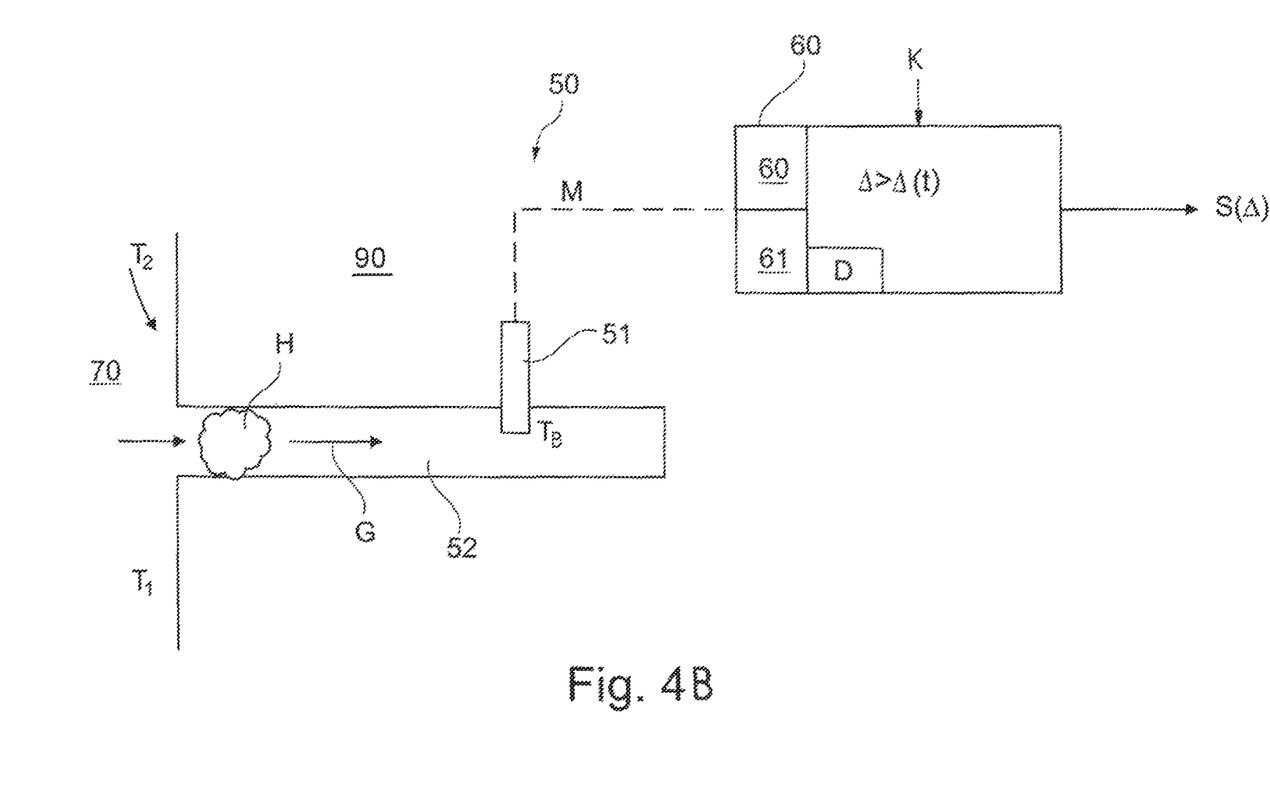
FIG. 4B shows a schematic illustration of the embodiment shown in FIG. 4A with a blockage in the inlet duct.

In FIG. 4A, the sensor device 50 is illustrated without a blockage H in the inlet duct 52. In FIG. 4B, in contrast, there is a blockage H in the inlet duct 52. Reference is made below to both figures.

A blockage H may occur, in particular, due to abraded particles and/or particles formed owing to damage in the gas turbine engine 10. Here, the inlet duct 52 is illustrated as a straight hole for reasons of simplicity. In principle, it is also possible for the inlet duct 52 to be nonlinear or to have other geometrical cross sections or shapes.

In the cavity 70 there is a gas, this including gas mixtures. It may be assumed here, by way of example, that the cavity 70 is a space between rotor blades 92 or rotor disks 90 of the high-pressure turbine 17. Under nominal operating conditions, a temperature T1 prevails in the cavity 70. The gas G at this temperature passes via the inlet duct 52 to the sensor element 51, which measures a temperature T in the nominal case (see FIG. 4A). A data processing device 60 connected to the sensor means 51 processes and monitors the measured values M, here the temperature T, detected by the sensor means 51 during operation.

As long as the temperature $T_1$ is in a certain permissible range, nominal operation of the gas turbine device 10 can be assumed.

If a different gas at a higher temperature $T_2$ enters the cavity 70 owing to a damage in the gas turbine engine 10, for example, a gas mixture, the mean temperature of which is too high in certain circumstances, forms in the cavity 70, and therefore it is necessary to take control measures.

It is one task of the sensor device 50 to detect this temperature increase, which may be dangerous in certain circumstances, and, where applicable, to respond to it.

There is then the risk that the inlet duct 52 is completely or partially closed by a blockage H (see FIG. 4B), with the result that the flow conditions of the gas G in the inlet duct 52 change.

This results in measurement errors. The sensor element 51 would be subject to heating, e.g. only by way of heat conduction via the surrounding material, which could be too slow in view of the high heat capacity of the material. At a certain time t (see FIG. 4B), therefore, it is not the temperature T which is measured at the sensor element 51 but a temperature $T_B$ that differs therefrom. The gas at the temperature T cannot progress as quickly to the sensor element 50 owing to the blockage H.

Figure 5:
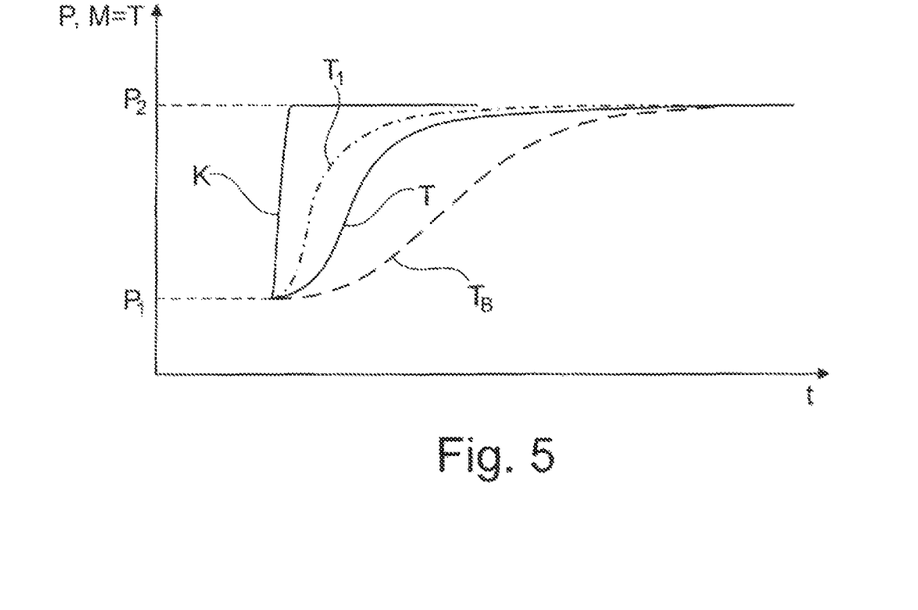
FIG. 5 shows an illustration of the time characteristic of measured values.

The time characteristic of measured temperature values M under different operating conditions is illustrated in FIG. 5.

Common to all the measured values is that they are determined in response to a thrust command K from a low power level $P_1$ to a higher power level $P_2$. Here, the thrust command K is designed essentially as a step function. In this case, data on the thrust behavior—and hence also on the thrust command K—can be fed to the evaluation unit 60 (see FIGS. 4A, 4B), making it possible to evaluate the time characteristic of the measured values M, M' in response to the thrust command K.

As a response to the thrust command K, the temperature $T_1$ of the gas in the cavity 70 rises in the form of a first-order step response and, after a certain time, reaches a steady value.

The value T measured by the sensor element 51 is subject to a time delay relative to the temperature change of the temperature $T_1$, i.e. it has a somewhat higher time constant since the gas G must, in particular, flow through the inlet duct 52.

If there is then a blockage H, as illustrated in FIG. 4B, the temperature measurement of the temperature $T_B$ which is then measured by the sensor element 51 is even further delayed.

This means that the sensor device 50 may in certain circumstances be too late in detecting that a temperature limit has been exceeded.

Figure 6:
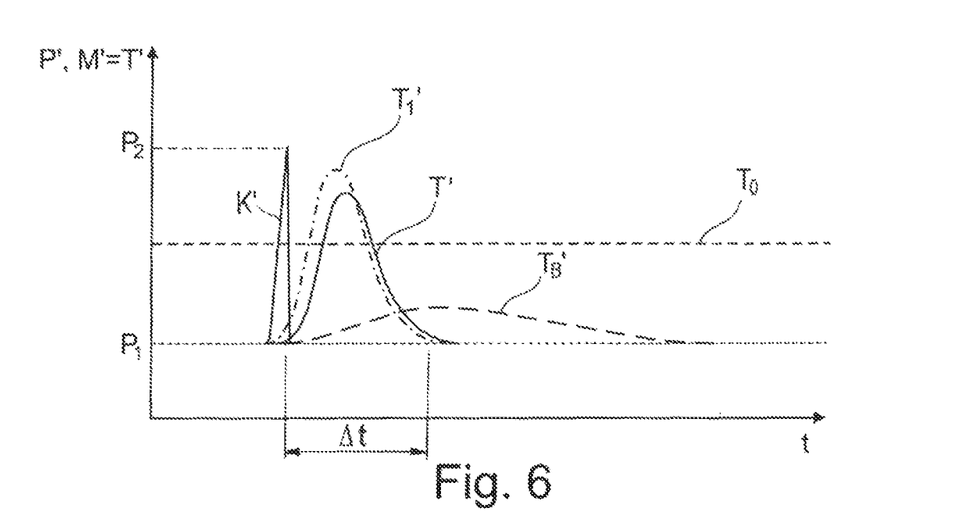
FIG. 6 shows an illustration of the time characteristic of the first derivatives of measured values, using one embodiment of a sensor device.

FIG. 5 illustrates the time characteristic of the measured temperature values. FIG. 6 shows the changes with respect to time (here, more particularly, in the derivatives) of the measured temperature values M'.

Here, the term "derivative" should be understood numerically since the data processing device 60 has an evaluation means 62 (see FIGS. 4A, 4B), by means of which the changes M' in the measured values with respect to time are calculated (numerical differentiation).

As in the situation shown in FIG. 5, the derivatives of the measured values M' follow a thrust command K. In the illustration as a derivative, the thrust command K' is illustrated as a pulse in the illustration in FIG. 6.

The derivative of the gas temperature $T'_1$ in the cavity and the derivative of the measured temperature T' without a blockage H pass through relatively pronounced maxima. In contrast, the derivative of the temperature $T'_B$ in the case of a blockage H has a very much shallower slope since the temperature change cannot take effect as quickly owing to the blockage H. Moreover, the value of the maximum of $T'_B$ does not reach the maximum values of T' or $T'_1$.

In the nominal case (see FIG. 4A), the maximum of the derivative of the temperature T' is measured within the time interval $\Delta t$. This relationship is fundamentally known and can be stored in the form of basic data D (e.g. table, functional relationship, characteristic map etc.). This time interval $\Delta t$ can be used as a criterion for the definition of a deviation $\Delta$ of the changes in the measured values with respect to time.

In the example under consideration, a blockage H can be detected, for example, from the fact that the maximum of the derivative of the temperature $T'_B$ is not yet present within the predefined time interval $\Delta t$ (e.g. 10 s) after the start of the thrust command K' in the blocked case (see FIG. 4B).

The nominal time behavior of the changes in the measured values M' with respect to time is stored in the evaluation means 60, e.g. as a functional relationship, as a table and/or as a characteristic map, i.e. the evaluation means 60 knows the nominal derivatives of the measured values M'.

If a detected maximum of the derivative of the measured value M' after the thrust command K' is slower than in the nominal case (i.e. the maximum of $T'_B$ is outside $\Delta t$), it is thus possible to infer a blockage H.

Owing to the absence of the maximum in the time interval $\Delta t$, there is a deviation $\Delta$ of the changes in the measured values M' with respect to time from a predefined criterion (here a maximum in the time interval $\Delta t$), and therefore a signal S relating to an at least partial blockage H can be output (see FIG. 4B).

It is thus possible, by means of the derivatives of the measured temperature values $T'_1(t)$, $T'(t)$ and $T'_B(t)$ (in particular of the maxima), more clearly to detect a blockage H than purely by detection of time characteristics of the measured temperature values $T_1$, $T(t)$, $T_B(t)$.

In addition or as an alternative, it is also possible, as a predefined criterion, to specify a temperature $T_o$ (see FIG. 6) that must be achieved after a thrust command K. This too would be a criterion by means of which the generation of a signal S relating to the detection of a blockage H could be initiated.

It is also possible to combine temperature criteria (e.g. $T_0$) and time criteria (e.g. $\Delta t$) as a kind of window. The derivatives of the temperature characteristics are then ascertained in such a way that the temperatures after a thrust command K' must exceed a threshold value $T_0$ within a certain time window after the thrust command K'. If this is not the case, this is a sign that there is a blockage H and that reliable measurement is not possible.

With reference to FIGS. 4A, 4B, the data processing device 60 has a means 61 for detecting the change M' in the measured values with respect to time (in this case the derivatives of the measured temperature values).

Another embodiment has an evaluation means 62 by means of which the changes M' in the measured values with respect to time can be compared to prestored basic data D on the time behavior of measured values for the same and/or a different property of the gas.

In addition or as an alternative, it is possible, for example, to use temperature data at an entirely different point in the gas turbine engine 10 as basic data D (i.e. temperatures measured at a distance from the sensor element 51), although they are also correlated in time with the thrust command K. This can be a temperature in the region of the combustion device 16, for example. If there is a thrust command K, this temperature changes in a known manner. This information can be set in relation to the measured values in the measurement zone 80 of the sensor element 51. If no rise is measured at the sensor element 51 in accordance with the abovementioned criteria after the rise in the temperatures in the region of the combustion device 16, for example, this indicates a blockage H.

Thus, if there is a predefined deviation $\Delta$ between the derivatives of the measured values M' and the prestored basic data D, a signal S relating to an at least partial blockage H of the at least one inlet duct 52 can be output. Thus, the signal S is a function of $\Delta$. It is thus possible, for example, to output a warning signal, or to bring about an emergency shutdown or some other defined change in the operating state of the gas turbine engine 10.

Figure 7:
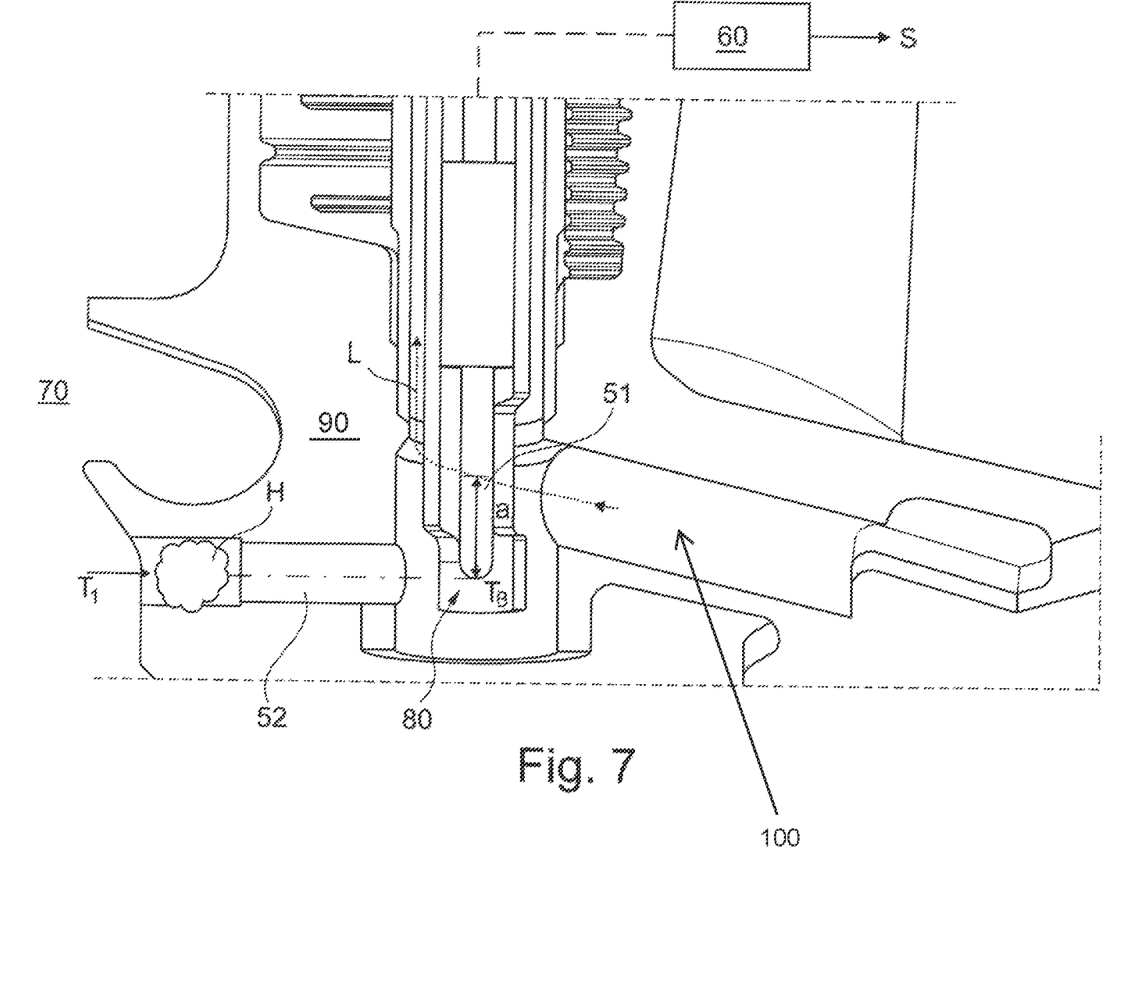
FIG. 7 shows a perspective sectional view of another embodiment of a sensor device.

FIG. 7 illustrates an embodiment of a sensor device 50 which is a variant of the embodiment shown in FIG. 4, and therefore reference may be made to the above description.

Here, the cavity 70 is part of a space between two rotor blades or rotor disks 90 of a compressor. Here, the gas G flows at a temperature T1 in the direction of the inlet duct 52, which is blocked by the blockage H, however. The sensor element 51, which is arranged in the measurement zone 80, can therefore only measure the temperature TB.

The data processing device 60, which is coupled to the sensor element 51, can determine from analysis of the changes (derivatives) of the measured temperature values with respect to time that the changes in the temperature T are such that a certain criterion is not met (see FIG. 6, for example). This can be the non-attainment of a threshold value, for example (e.g. $T_0$), non-compliance with a certain time interval (e.g. $\Delta t$) or a combination of the criteria.

In the embodiment shown in FIG. 7, the sensor element 51 projects into the measurement zone 80 and, in the nominal case, the gas G flows around it, wherein the gas flow then flows out again via a line that is not illustrated here.

If the inlet duct 52 is then blocked, the outflow duct 100 may still be open. A new gas flow in the form of a leakage flow could then form (see dotted line in FIG. 7), with gas being sucked in via the outflow duct 100 and then flowing via existing leaks L in the holder of the sensor element 51. The sensor element 51 would detect false measured temperature values. The dynamic behavior (derivatives) of the measured values would also be changed.

In order to minimize this source of errors, the inlet of the outflow duct 100 is offset axially upward from the sensor element 51 and the measurement zone 80 by a clearance a. Thus, even if the inflow through the outflow duct 100 is incorrect, the sensor element 51 is not situated in the leakage flow which then forms, i.e. is outside the flow path from the outflow duct 100 to leaks.

The embodiments which have been described in conjunction with FIGS. 4 to 6 relate to temperature measurements. The same principle, i.e. the determination and processing of changes in the measured values M' with respect to time to detect a blockage H, can also be used for pressure measurements or measurements of compositions.

In the example illustrated here, the properties of a gas are detected. In principle, however, this procedure can be used with fluids in general. It is thus possible, for example, to detect a transient change in an oil temperature in comparison with a reference temperature.

LIST OF REFERENCE SIGNS

9 Main axis of rotation
10 Gas turbine engine
11 Core engine
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Fan
24 Stationary supporting structure
26 Shaft
27 Connecting shaft
28 Sun gear
30 Gear mechanism
32 Planet gears
34 Planet carrier
36 Linkage
38 Ring gear
40 Linkage
50 Sensor device
51 Sensor element
52 Inlet duct
60 Data processing device
61 Means for detecting a change in a measured value with respect to time
62 Evaluation means
70 Cavity
80 Measurement zone
A Core air flow
B Bypass air flow
D Prestored basic data
Δ Predetermined deviation between the change in measured values with respect to time and prestored data
Δt Time interval
G Fluid, gas
H Blockage
K Thrust command
K' Derivative of the thrust command
L Leak
M Measured values
M' Change with respect to time (derivative) of the measured values
$P_1$ Low power level
$P_2$ Higher power level
P' Change in power with respect to time
S Signal
T Measured temperature at the sensor element without a blockage in the inlet duct
$T_0$ Threshold value
$T_B$ Measured temperature at the sensor element with a blockage in the inlet duct
$T_1$ First gas temperature in the cavity
$T_2$ Second gas temperature in the cavity
T' Change with respect to time (derivative) in the measured temperature values

The invention claimed is:

1. A sensor arrangement for determining measured values of a property of a fluid in a cavity of a gas turbine engine, comprising:
a pair of axially adjacent rotor disks of a compressor or a turbine of the gas turbine engine, wherein the cavity is positioned axially between the rotor disks and radially inwardly of a main flow path through the gas turbine engine;
a sensor element;
an inlet duct for carrying the fluid from the cavity to the sensor element, the inlet duct having an entrance connecting to the cavity, wherein the inlet duct is positioned in one of the rotor disks and the sensor element is positioned in the inlet duct distally from the entrance to space the sensor element away from the cavity, and wherein the sensor element is fluidly connected to the cavity only via the inlet duct, the sensor element providing the measured values;
a data processing device which is coupled to the sensor element, wherein the data processing device processes the measured values, and wherein the data processing device detects a change in the measured values with respect to time;
wherein the data processing device includes an evaluation device which detects the changes in the measured values with respect to time; and
wherein the data processing device includes a predefined criterion, and, if there is a deviation in the changes in the measured values with respect to time from the predefined criterion, a signal is output relating to an at least partial blockage of the inlet duct.

2. The sensor arrangement according to claim 1, wherein the data processing device includes prestored basic data and the evaluation device compares changes in the measured values with respect to time to the prestored basic data for at least one chosen from the property of the fluid and a second property of the fluid.

3. The sensor arrangement according to claim 1, wherein the property of the fluid is at least one chosen from a temperature, a pressure, and a composition.

4. The sensor arrangement according to claim 1, wherein a first derivative of the measured values is determined numerically using the data processing device to detect a change in the measured values with respect to time.

5. The sensor arrangement according to claim 1, wherein the data processing device includes prestored basic data comprising at least one chosen from a time characteristic and a first derivative of the time characteristic of the measured values during nominal operation without a blockage of the inlet duct.

6. The sensor arrangement according to claim 1, wherein the data processing device includes prestored basic data, wherein the predefined criterion comprises at least one chosen from a temperature and a time interval, and wherein the predefined criterion is stored in the prestored basic data as at least one chosen from a table, a characteristic map, and a functional relationship.

7. The sensor arrangement according to claim 1, wherein at least one chosen from the measured values and changes in the measured values with respect to time are determined as a function of a thrust command of the gas turbine engine.

8. The sensor arrangement according to claim 1, further comprising an outflow duct, wherein the sensor element is arranged in a measurement zone into which the fluid flows under nominal operating conditions and out of which the fluid flows at least partially via the outflow duct.

9. The sensor arrangement according to claim 8, wherein the sensor element is situated outside a flow path that leads from the outflow duct to an exterior.

10. The sensor arrangement according to claim 1, wherein the signal is used to switch off or change an operating state of the gas turbine engine.

11. A measurement method for determining measured values of a property of a fluid in a cavity of a gas turbine engine, comprising:
providing:
a pair of axially adjacent rotor disks of a compressor or a turbine of the gas turbine engine, wherein the cavity is positioned axially between the rotor disks and radially inwardly of a main flow path through the gas turbine engine;
a sensor element;
an inlet duct for carrying the fluid from the cavity to the sensor element, the inlet duct having an entrance connecting to the cavity, wherein the inlet duct is positioned in one of the rotor disks and the sensor element is positioned in the inlet duct distally from the entrance to space the sensor element away from the cavity, and wherein the sensor element is fluidly connected to the cavity only via the inlet duct, the sensor element providing the measured values;
a data processing device coupled to the sensor element, wherein the data processing device includes an evaluation device;
processing the measured values;
detecting changes in the measured values with respect to time with the data processing device;
detecting changes in the measured values with respect to time with the evaluation device;
outputting a signal relating to an at least partial blockage of the inlet duct if there is a deviation in the changes in the measured values with respect to time from a predefined criterion; and
outputting a signal relating to an at least partial blockage of the inlet duct if there is a predefined deviation between changes in the measured values with respect to time to prestored basic data in the data processing device.

12. The measurement method according to claim 11, and further comprising detecting changes in the measured values with respect to time for at least one chosen from the property of the fluid and a second property of the fluid.

13. The measurement method according to claim 11, wherein the property of the fluid is at least one chosen from a temperature, a pressure, and a composition.

14. The measurement method according to claim 11, and further comprising determining a change in the measured values with respect to time from the measured values.

15. The measurement method according to claim 11, wherein the prestored basic data in the data processing device comprises at least one chosen from the time characteristic and a first derivative of a time characteristic of measured values during nominal operation without a blockage of the inlet duct.

16. The measurement method according to claim 11, wherein the predefined criterion is at least one chosen from a temperature and a time interval, wherein the predefined criterion is stored as at least one chosen from a table, a characteristic map, and a functional relationship.

17. The measurement method according to claim 11, and further comprising determining at least one chosen from the measured values and changes in the measured values with respect to time as a function of a thrust command of the gas turbine engine.

18. The measurement method according to claim 11, wherein the predefined deviation between changes in the measured values with respect to time and the prestored basic data comprises a threshold value for a first derivative of the measured values or a change in the measured property of the fluid with respect to time.

19. The measurement method according to claim 11, and further comprising using the signal to switch off or change an operating state of the gas turbine engine.

20. The sensor arrangement according to claim 1, wherein the fluid is a gas.

* * * * *